E. W. BINGHAM.
BRICK-KILN.
No. 7,504. Reissued Feb. 13, 1877.
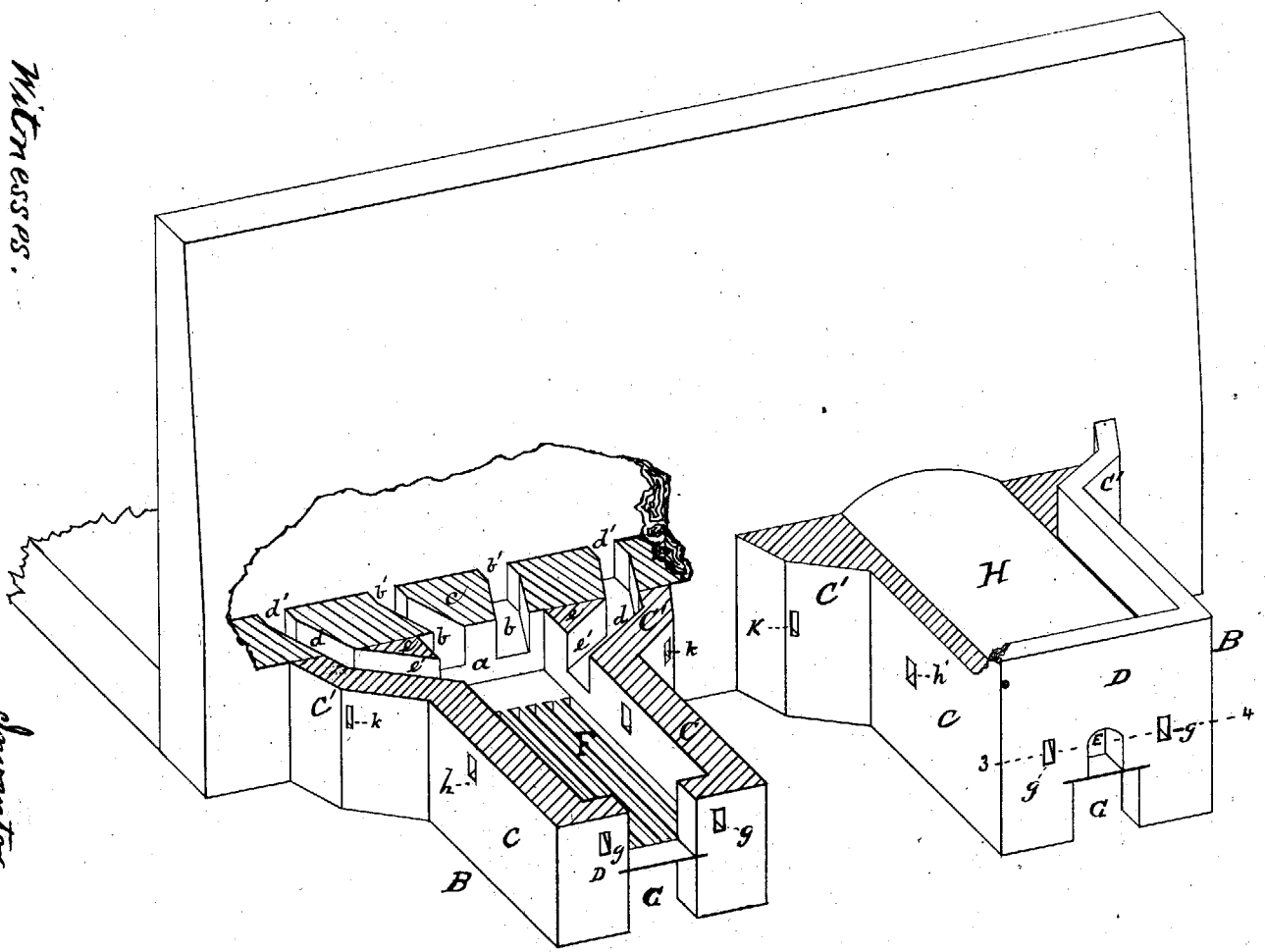
Witnesses.
John T. Arms.
W. S. Fletcher
Inventor.
E. W. Bingham
N. PETERS, PHOTO-LITHOGRAPHER, WASHINGTON, D. C.

UNITED STATES PATENT OFFICE.

EDWARD W. BINGHAM, OF PHILADELPHIA, PENNSYLVANIA.

IMPROVEMENT IN BRICK-KILNS.

Specification forming part of Letters Patent No. 181,399, dated August 22, 1876; reissue No. 7,504, dated February 13, 1877; application filed January 24, 1877.

*To all whom it may concern:*

Be it known that I, EDWARD W. BINGHAM, of Philadelphia, in the county of Philadelphia and State of Pennsylvania, have invented a new and valuable Improvement in Brick-Kilns; and I do hereby declare that the following is a full, clear, and exact description of the construction and operation of the same, reference being had to the annexed drawing, making a part of this specification, and to the letters and figures of reference marked thereon.

The figure is a representation of a perspective sectional view of one side of my improved kiln.

This invention has relation to kilns; and it consists in the construction and novel arrangement of the exterior furnaces in immediate contact with the kiln-wall, which forms the rear walls of the furnaces, and of the curved or bent eyes in the kiln-wall, whereby several eyes may be made to communicate with a furnace of small width built against the side of a kiln; of the rake-holes in the furnace-walls to correspond with the angular position of the mouths of the opposite eyes opening into the furnace, and of a kiln having such exterior furnaces built against its outer walls, as hereinafter shown and described.

The common style of kiln in use for burning brick consists of two principal side walls parallel to each other and about twenty-eight feet apart. Between these walls the brick to be burned are set with arches or flues formed at regular distances apart, and extending from side wall to side wall in the bottom of the pile. These arches serve as furnace-chambers in consuming the fuel in burning, and are grated or otherwise floored to suit the fuel used. Doorways pierce these side walls at intervals corresponding with the ends of the kiln-arches within, and through them the fuel is thrown.

In this improved kiln the setting of the brick and kiln-arches therewith is precisely the same as formerly; but, for the straight doorways through these side walls, are substituted eyes or passages built smaller and curved or bent so that several kiln-arches may be brought into direct communication with a furnace-chamber of less expanse than the kiln-arches embraced, built on the outer side of the kiln-wall. These kiln-wall eyes may be curved or bent more or less to suit.

In operation, the fuel is first decomposed in contact with the atmosphere in the furnace, and partly consumed; the intensely-heated gaseous products, together with more air, are then drawn through the bent eyes into the several kiln-arches, and from thence diffused through the mass of brick, where combustion is completed. The operation can be regulated at will in any particular kiln-arch by closing more or less the eye leading into it, the same thing being done on the opposide side of the kiln, if necessary.

In the accompanying drawings, the letter A designates one of two vertical side walls of a kiln, and B a furnace built against this wall, so that a section, *a*, thereof forms the rear wall of said furnace. C C indicate the side walls of the furnace, and D its front wall, in which is usually located the doorway E. F is the grate, built about nine inches below the bottom of the kiln-eyes, and provided underneath with an ash-pit, G. The drawings illustrate a furnace with four eyes of the kiln-wall communicating. Two of these eyes, *b b*, are designed to open into the furnace through its rear wall *a*, which is a section of the wall of the kiln, as above stated. Between these a wedge-shaped column, *c*, of the kiln-wall is built up, whereof the broader side is turned toward the interior of the kiln, to correspond with the mass of bricks or other ware between the arches into which the eyes lead. The openings or portions *b'*, which lead into the arches, are designed to run in a direction perpendicular, or nearly so, to the interior face of the kiln-wall, so as to be in line with the arches. The bottoms of these eyes are raised a little above the level of the grate, which is laid in a horizontal position, as shown in the drawings. On each side of these two eyes is arranged an eye, *d*, which is divided from its adjacent eye *b* by building in the kiln-wall a wedge-shaped column, *e*, around which the eye *d* extends in such a manner that while its interior portion *d'* enters the kiln in the direction, or nearly in the direction, of the kiln-arch the furnace end *e'* is brought through the side wall C of the furnace a short distance in front of the kiln-wall *a*, which forms its rear wall. This bent-eye passage, therefore, extends through the side wall of the furnace, which is expanded at C′ to receive it. H indicates the arched top of the furnace, which is sprung transversely from side wall to side wall, as shown in the drawings.

Through the front wall D of the furnace extend the rake-holes *g*. These are so built that their exterior walls will be in line with the eyes *b* on the same side of the furnace, while their interior walls next the furnace-door will be somewhat oblique in the direction of the eyes *b* on the opposite side. In this manner these holes serve to ascertain the condition of the arches of the same side, and to rake the eyes *b* of the opposite side. For the eyes *d* oblique rake holes *h* are made through the side walls C, and peep-holes *k* are built through the bent exterior walls of said eyes, as shown in the drawing.

This construction may be varied by building a central eye through the kiln-wall section *a*, and omitting the central wedge-shaped column, running the rear eye straight. With the lateral bent eyes the furnace will now be adapted to serve three arches of the kiln; or the central bent eyes *b b* may be omitted entirely, in which case the furnace will be adapted to serve two arches of the kiln.

The bent eyes are designed to effect a saving of material in building the kiln and furnaces, to enable the depth of the furnaces to be reduced, as the drafts of air entering the same will be directed against the walls of the eyes, their temperature raised, and their mixture with the heated gases from the furnace facilitated; and particularly to enable a furnace situated at the best distance from the brick, to reach the greatest possible number of brick, and at the same time preserve perfect uniformity and regularity of temperature on all sides, without which the best results cannot be attained.

What I claim as new, and desire to secure by Letters Patent, is—

1. The combination, with a vertical kiln-wall section, *a*, forming the back of a furnace, and having one or more eyes opening through it, of the bent side eyes *d d*, opening through the side walls C C of said furnace, substantially as specified.

2. The combination, with a kiln-furnace having eyes opening angularly into its rear portion, of the oblique rake-holes in the walls of said furnace opposite said eyes, to facilitate opening and closing the same, substantially as specified.

3. The combination, with the side walls C C of a kiln-furnace, of the obliquely-placed openings or mouths *e′* of the bent lateral eyes *d*, which extend through the kiln-wall to the arches, substantially as specified.

4. The combination, with a vertical kiln-wall section, *a*, forming the back of a furnace, of the bent lateral eyes *d d* opening through the side walls C C of the furnace, substantiall as specified.

5. In a kiln, the kiln-wall eyes *d b*, each leading from or into its own particular kiln-arch, and bent or curved substantially as and for the purpose specified.

6. In a kiln, the combination, with a furnace built against the exterior face of the kiln-wall, of the bent kiln-wall eyes *b b*, each leading into its own particular kiln-arch, substantially as shown, and for the purpose specified.

7. In a kiln, the combination of a bent or curved passage through and located within the kiln-wall, leading into a particular kiln-arch, and a furnace-chamber, situated on the outside of said kiln-wall, substantially as shown and described.

EDWARD W. BINGHAM.

Witnesses:
JOHN T. ARMS,
D. W. KETCHAM.